Figure 1:
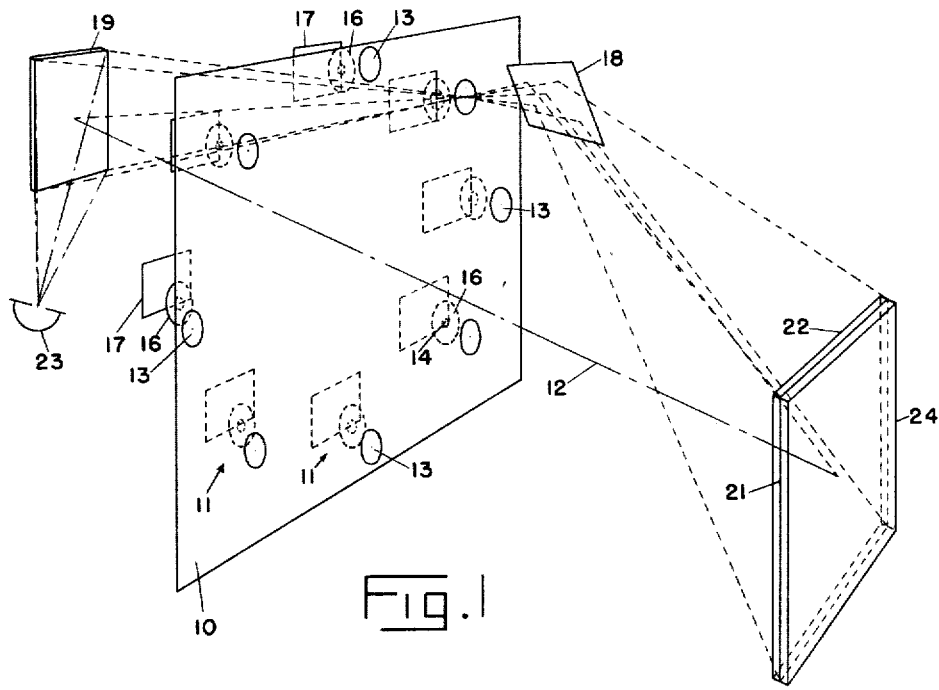

July 30, 1963

B. L. SITES 3,099,557

OPTICAL SYSTEM AND METHOD FOR MAKING
CORRECTED COLOR SEPARATIONS

Filed Feb. 26, 1957

INVENTOR.
BENJAMIN L. SITES
BY
*Byron Hume Groen & Clement*
ATTORNEYS

United States Patent Office 3,099,557
Patented July 30, 1963

3,099,557
OPTICAL SYSTEM AND METHOD FOR MAKING CORRECTED COLOR SEPARATIONS
Benjamin L. Sites, Elmhurst, Ill., assignor to Miehle-Goss-Dexter, Incorporated, Chicago, Ill., a corporation of Delaware
Filed Feb. 26, 1957, Ser. No. 642,543
3 Claims. (Cl. 96—30)

This invention pertains, in general, to the art of making process color printing plates for the printing industry. It is directed more specifically to a method and optical system for making corrected, color separation transparencies directly from multicolored subjects in accordance with the principle disclosed in my issued Patent 2,567,240.

To date a vast amount of experimental work has been done and various types of devices have been developed for the sole purpose of producing truly corrected, color separation transparencies from which process color printing plates can be made without the need for time consuming, expensive hand work by highly skilled color retouchers. To my knowledge, however, all of the practicable methods and devices yet disclosed, including the apparatus shown in my Patent 2,567,240 and the copending application Serial No. 624,027, filed November 23, 1956, incorporate electronic elements and circuitry to convert intelligence received from the subject in the form of light energy, into corresponding electrical energy. This has been deemed essential, heretofore, in order to modulate and mix the respective energies or signals whereby to effect color correction operations.

Devices such as are disclosed in the above mentioned patent and pending application are capable of producing high fidelity, corrected color separations at exceptionally high speeds. However, such machines are complicated and expensive and I have discovered that equally high fidelity color separations can be made with a relatively inexpensive optical apparatus. This novel device and the method evolved for its operation are based on the proven principle disclosed in Patent 2,567,240 and utilize light energy alone for all of the color separation and correction operations.

Moreover, with the apparatus of this invention the subject to be reproduced is viewed in its entirety and full or continuous tone images thereof are created for the purpose of effecting color correction functions. In the known devices, the subject is scanned whereby each elemental area thereof is sensed or analyzed independently, in logical sequence, and, therefore, the resolution obtained in the reproduction is dependent upon the characteristics of the scanning means.

According to this invention, the light energy reflected from or transmitted by the subject or copy to be reproduced is separated into a plurality of selected spectral color bands covering the gamut of the spectrum. As a matter of fact, the invention contemplates the use of all the spectral components of the light emitted or reflected from the colored subject in the form of bands each having a width which is substantially one Nth of the spectrum where N is the total number of bands. Each band will be less than a major portion of the spectrum and will have an exact composition with respect to its spectral components. A suitable optical assembly in each color band creates a corresponding light image of the original and the intensities of the respective light images are modulated in accordance with predetermined factors, having positive and negative signs, which are based on the reflectance, absorbance characteristics of printed samples of the pigments and paper to be used in making the reproductions. All of the images thus formed are then combined in a manner whereby the overall intensity of those images having negative sign factors is subtracted from the overall intensity of those images having positive sign factors to produce a resultant light image whose overall light intensity represents a corrected, primary color separation which is used to expose a photosensitive element.

Thus it will be evident that by a suitable combination of optical means alone, a composite light image representing a corrected primary color separation can be obtained from which a high fidelity, corrected color separation transparency can be made direct.

It is a primary object of my invention, therefore, to provide a relatively simple and economical device for making corrected, primary color separation transparencies. Another object is to provide a device employing optical means alone for making corrected, color separation transparencies. A further object is to provide a color separation and correction apparatus which can be readily adapted to existing process color cameras.

Still another object resides in the provision of optical means which utilize light energy alone to produce corrected primary color separations directly from a colored subject.

Figure 2:
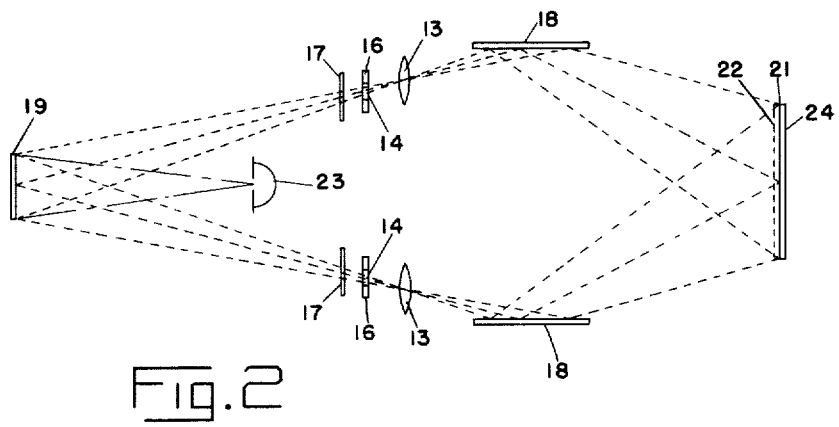

Other objects and advantages will become apparent from the following descriptions and accompanying drawings wherein;

FIGURE 1 is a schematic perspective view illustrating the arrangement of the various components of the invention; and FIGURE 2 is a side elevational view taken along the axis of FIGURE 1.

As illustrated in the drawings this invention is adapted to be incorporated in a substantially conventional process color camera such as are commonly used for making three and four color process printing plates. In place of the customary lens board, however, I provide a panel 10 which is equipped with a multiple number of optical assemblies, indicated at 11, which are arranged in circular fashion about the normal optical axis 12.

Each one of the respective optical assemblies essentially comprises a lens 13, a spectral color filter 14, a diaphragm or aperture control member 16, a shutter 17 and a reflecting mirror 18.

The lenses 13 are accurately matched and they are arranged and located so as to have comon conjugate focal planes. Thus, the images of the copy 19 created by the respective lenses 13 will be precisely superimposed in the focal plane 21. Because the lenses are offset with respect to the normal optical axis 12, the mirrors 18 are provided to reflect the respective images to a common focal point in the plane 21. Only one such mirror is shown in the drawings to simplify the illustrations, but it will be understood that a similar mirror is included in each optical assembly.

As stated above each optical assembly also includes a spectral color filter. These filters are selected so as to embrace the gamut of the spectrum and each one will transmit light waves in a predetermined band thereof. Thus when the subject to be reproduced is viewed by the respective optical assemblies, a corresponding number of complete images, each in a different selected wave band of the spectrum, will be created or projected in superimposed relation in the focal plane 21 of the camera.

In the drawings I have illustrated eight optical assemblies, with their respective filters, which number I have determined is adequate to produce high quality commercial reproductions. This is not to be taken as a limitation however, because the number of optical assemblies and filters used, and thus the number of selected spectral color bands in which the subject is sensed or analyzed depends upon the number of primary, secondary and tertiary colors in the subject and/or the quality desired in the reproductions.

From the description thus far it will be apparent that when the subject to be reproduced is viewed by the respective optical assemblies, eight continuous tone images thereof are created, each in its respective wave band. However, because of the inability of commercial pigments to absorb and reflect light waves in the respective spectral bands in their true values, it is necessary to modulate the intensity of the respective light images in order to compensate for this condition.

For example, a spot of solid red in the subject should reflect 100% of the light waves in the red band of the spectrum and, therefore, should be represented by a maximum light intensity at the corresponding area of the light image formed through the red filter. Conversely, the same red spot should absorb 100% of the light waves in the green band of the spectrum and should be represented by a complete absence of light intensity at the corresponding area of the light image formed through the green filter. Such conditions are impossible to achieve, however, due to the inherent deficiencies of commercial pigments and in actual practice it will be found that the red spot will be represented by somewhat less than the maximum intensity in the light image formed through the red filter. Moreover, instead of absorbing all of the light waves in the green band of the spectrum, a certain amount will be reflected and will be represented by a proportionate light intensity in the light image formed through the green filter.

Thus it will be evident that in order to obtain a true reproduction of the subject in its original colors, the light intensity of the respective images must be modified in order to compensate for the inability of the pigments to reflect and absorb light waves with true fidelity.

Such modifications is acomplished by setting the aperture of the diaphragm or control member 16 to thereby control the light intensity of the respective images in accordance with predetermined intensity factors which are based on the reflectance absorbance characteristics of the actual pigments and paper to be used in making the reproductions. The principle and method whereby the intensity factors for the respective light images are determined are fully explained in my prior Patent 2,567,240. However, the following example will illustrate the conditions involved and the manner in which the principle is adapted to the present optical system involving light energy alone.

In any color correcting system the object is to produce a balanced set of primary color printing plates each plate of which will have correctly represented therein all the tone values of one of the primary colors. For simplicity, three primary colors, yellow, magenta and cyan will be considered. With these colors a color chart can be produced which will include the secondary colors orange, green and violet as well as white and the tertiary color black.

The percentage of primary colors used to produce such a chart are given in the following table:

PERCENTAGE OF PRIMARY REQUIRED

| Color to be Reproduced | Primary Color | | |
|---|---|---|---|
| | Yellow | Magenta | Cyan |
| White | 0 | 0 | 0 |
| Black | 100 | 100 | 100 |
| Yellow | 100 | 0 | 0 |
| Magenta | 0 | 100 | 0 |
| Green | 100 | 0 | 100 |
| Cyan | 0 | 0 | 100 |
| Orange | 100 | 100 | 0 |
| Violet | 0 | 100 | 100 |

It is a well established fact that if such a color chart can be accurately reproduced by any color correcting system, it is possible to use the same system to reproduce sundry originals in color such as oil paintings and the like.

It is obvious that a set of three primary plates are necessary to reproduce such a chart in its entirety, however, only the magenta printing plate will be considered in detail.

From the table it can be shown that a perfect red separation plate should interpret all the non-red colors (yellow, gree and cyan) in the same manner as it does white, and all of the red colors (magenta, orange and violet) in the same manner as it does black. Since this is true for the printing plate it is likewise true for the photographic negative from which the plate is made.

A perfect red separation negative made by photographing the color chart through an appropriate filter would show all of the areas representing black, magenta, orange and violet as having equal and minimum density, whereas the areas representing white, yellow, green and cyan would have equal but maximum density. In actual practice, however, a negative produced by conventional methods, through a green B filter, for example, is far from a perfect rendition. The cyan area may be in error by as much as 50%, the green by about 60%, the magenta about 15% and the orange about 5%. Accordingly a conventional red separation negative would have to be retouched to increase the density of all the cyan colors in the original by about 50% and all of the green colors by about 60%. The density of the magenta and orange colors on the other hand would have to be reduced by about 15% and 5% respectively.

The problem, therefore, is how to produce a perfect negative automatically without the need for manual retouching to add or subtract density in local areas. The solution of this problem resides in the proper determination of the relative intensities of the light images formed by the N number of spectral bands referred to above.

To determine the extent of correction required for a given set of primary colors the color chart as mentioned above is illuminated with substantially white light and the intensity of the light reflected from the respective chart colors in each of the respective N spectral bands is measured by a suitable device, such as a panchromatic light meter or density meter, to determine the reflectance-absorbance characteristics thereof. For this example, the analysis will be made with respect to the light images in the red, blue and green portions of the spectrum in conjunction with three chart colors, namely; white, green and black. The reason for selecting these three chart colors is that in a red separation negative it is desired to have the green and white colors of equal density and maximum with respect to the black density.

In an experimental set-up, when the white portion of the chart is illuminated, the reflection intensity readings recorded by an appropriate meter included in suitable photocell pick up circuitry, in the red, green and blue spectral bands are 108, 104 and 127 volts respectively. When the green is illuminated the meter voltages are 36, 32 and 104 respectively. In like manner when the black is illuminated, the output meter voltages are 36, 18 and 37 respectively.

If the output voltages from white are combined, the total reflected energy from the three spectral bands mentioned would be represented by the sum of 108, 104 and 127 or 339 volts. In like manner the total output for green and black would be the summation of their respective values or 172 and 91 volts respectively. It is desired, however, to have the light energy output from the green equal to that from the white and still preserve a maximum-minimum ratio between the black and white outputs.

Accordingly, let the output from the red band be arbitrarily amplified by a constant amplifying factor A, the green by a factor B and the blue by a factor C. Then the output for the white of the chart will be 108A instead of 108, 104B for the green, and 127C for the blue. Therefore, the total output for the white will be expressed as follows:

$$108A + 104B + 127C = \text{total output for white}$$

The green and black colors of the chart can be treated in the same way which gives the corresponding relations:

For green $36A + 32B + 104C = \text{total output for green}$
For black $36A + 18B + 37C = \text{total output for black}$ The amplification factors permit equating the left hand side of the equation to any output value desired. Therefore, in the case of the green color of the chart, it is permissible to set the output value to that of the white so that a set of equations can be formed as follows:

$$108A + 104B + 127C = 339 \text{ (white)}$$
$$36A + 32B + 104C = 339 \text{ (green made equal to white)}$$
$$36A + 18B + 37C = 91 \text{ (black)}$$

A solution of these equations for A, B and C gives the following values:

$$A = -1.317951$$
$$B = +.125227$$
$$C = +3.671145$$

It will be noted that A has a negative value. This means that the intensity of the light image in the red spectral band must be amplified 1.317951 times, but it is to be subtracted from the combined intensity of the light images in the other two spectral bands. A proper application of these amplification factors as derived from the set of equations will cause the total intensity of the white and green light images to be equivalent to 339 and the total intensity of the black light image to be the equivalent of 91. Like intensities produce like densities in the resultant negative. Thus the intensity of the respective light images can be controlled to produce a red separation negative wherein the white and green will be represented by equal densities that are maximum with respect to the black density.

While the above is an illustration showing how amplification factors are found where three colors only are involved, it is submitted that for the complete chart wherein eight significant colors are involved, it is necessary to set up a series of eight simultaneous equations for a proper and complete solution, utilizing N spectral bands where, in this instance, N equals 8.

Once the factors have been determined for a given set of pigments the respective diaphragms 16 can be set accordingly and these settings will remain fixed as long as the same pigments are used to make the reproductions. If for some reason it becomes necessary to utilize different pigments, having different reflectivity characteristics, new intensity factors can readily be determined and the diaphragms or apertures modified accordingly.

Having thus described the various elements involved in the present invention, the method whereby they are utilized to make corrected color separation transparencies will now be explained. It is first necessary to determine the intensity factors for the respective spectral color bands for each particular primary color separation to be made. It will be appreciated that these factors will be different for each particular primary color separation. For example, the red or magenta separation will require one group of settings, the yellow separation, another group of settings, etc.

This is done in the manner previously described and as evident therefrom some of the factors will have positive signs whereas others will have negative signs.

Once these factors have been determined the respective apertures are set for the particular primary color separation to be made, which, for the sake of example, we will consider as the red separation.

At this point, the shutters 17 for those spectral color bands which have been determined to have negative sign intensity factors are opened, whereas the shutters for those spectral color bands which have positive sign intensity factors are closed. A panchromatic film 22 is placed in the camera with its emulsion side facing away from the lens board 10 and in the focal plane 21. The copy 19 is then illuminated by a suitable light source 23 and the film 22 exposed to the combined overall intensities of the light images formed in the spectral color bands having negative sign factors. The length of the exposure will depend upon the film speed and will be relatively standardized.

After exposure, the film 22 is removed from the camera and developed to provide a mask, the overall density of which is equivalent to the combined intensities of the negative sign images. This mask is then replaced in the camera in its original position.

At this stage of the process the shutters for the negative sign images are closed and those for the positive sign images are opened and a panchromatic photosensitive transparency or film 24 is placed in the camera with its emulsion side facing the lens board 10 and preferably in close contact with the adjacent surface of the mask 22.

Thereupon the copy 19 is again illuminated whereby to expose the film 24 to the combined intensities of the positive sign images, through the mask 22. The latter has the effect of reducing the overall intensity of the combined positive sign light images by an amount equivalent to the combined intensities of the negative sign images so that, upon development, the overall density of the film 24 represents a fully corrected primary color separation, red in this instance.

The same procedure will be followed in making the other primary color separations, i.e., yellow, blue and also black, requiring only that the aperture settings be readjusted accordingly for each color separation.

Having thus described my invention in its simplest form it will be evident that various modifications may readily be made and therefore I do not wish to be limited to the specific disclosure.

For example any one of several means may be utilized to control the aperture settings such as adjustable iris type diaphragms or plates having fixed apertures which would be interchangeable depending upon specific requirements. Moreover, the particular type of filters used is not critical, the only requirement being that they be capable of maximum light transmission within relatively narrow spectral bands.

The optical systems also may be as shown or it may comprise a single objective lens in combination with suitable reflecting prisms and mirrors whereby the original beam is split into its selected spectral components then recombined in one composite image.

It will also be evident that the masking operation may be accomplished in a manner other than that described herein. As an example, the silver emulsion mask may be replaced by a special type of light sensitive emulsion having a much slower speed than silver, such as can be produced with certain azo dyes, and which would become opaque in relation to exposure. In such case the special emulsion would be exposed to the combined light intensities of the negative sign light images and would produce a mask without special development. Then a silver emulsion could be exposed to the combined intensities of the positive sign images, through said mask and because of the relatively high speed of the silver emulsion, this second exposure would not change the characteristics of the mask. The silver emulsion, upon development, would constitute the corrected primary color separation transparency.

It also would be quite practical to use a standard, single lens camera to carry out the disclosed method. In such case multiple sequential exposures would be made through individual filters with each exposure being controlled according to its respective intensity factor. Such procedure would require considerably more time, however, and a great deal more skill on the part of the operator.

I claim:

1. In a method of producing primary color separations corrected for the pigment colors to be used in making printed reproductions of a multi-colored original, the steps which include the illuminating of the multi-colored original, directing the light emitted by said original through N number of spectral filters covering the gamut of the spectrum to create a corresponding number of light images and which are respectively identified with one of the selected spectral color bands, said number N being equal to one plus the number of primary, secondary and tertiary colors used to reproduce the original, optically modulating the overall light intensity of the respective images in accordance with a certain correction factor for each image based on the spectral reflectivity characteristics of the respective pigment colors in each of the several spectral color bands and the spectral sensitivity of the panchromatic emulsion used, some of said factors having a positive sign and others having a negative sign, shutting off those light images whose factors bear a positive sign and then exposing a panchromatic photosensitive element to the combined intensities of those light images remaining and whose factors bear a negative sign, developing said element to create a mask, shutting off those light images whose factors bear a negative sign and then exposing though said mask a second panchromatic sensitive element to the combined intensities of those light images remaining and whose factors bear a positive sign, and finally developing said second photosensitive element to produce a corrected color separation transparency.

2. In a method of producing primary color separations corrected for the pigment colors to be used in making printed reproductions of a multi-colored original, the steps which include making a chart containing primary, secondary and tertiary colors made with said pigments, illuminating said chart with white light, directing the light emitted by each of said chart colors through each one of a set of spectral color filters having fixed spectral color transmission characteristics and which filters correspond in number to the number of primary, secondary ad tertiary colors in said chart, plus one, to obtain data from which a correction factor for each filter of either a negative or positive value can be determined and which are required to compensate for errors induced by the spectral reflectivity characteristics of the respective pigment colors in each of the respective spectral color bands and the spectral sensitivity of the panchromatic emulsion used, illuminating the original copy to be reproduced, directing the light emitted by the copy through the same set of spectral color filters, creating a light image of the original copy in each one of the separate spectral color bands, adjusting the intensity of the light passing through the respective filters in accordance with the respective correction factors, superimposing the light images in those bands associated with negative correction factors to form a composite light image in a common focal plane, exposing a panchromatic film to the composite light image to create a mask, superimposing the light images in those bands associated with positive correction factors to form a second composite light image in a common focal plane, exposing a second panchromatic film to said second composite light image, through said mask, and finally developing said second photosensitive element.

3. In a method of producing primary color separations corrected for the pigment colors to be used in making printed reproductions of a multi-colored original, the steps which include the illuminating of the multi-colored original, directing the light emitted by said original through N number of substantially non-overlapping spectral filters covering the gamut of the spectrum employed, whereby to create a corresponding number of light images and which are respectively identified with one of the selected spectral color bands, said number N being equal to one plus the number of primary, secondary and tertiary colors used to reproduce the original, controlling the overall light intensity of the respective light images in accordance with certain positive and negative correction intensity factors based on and required to compensate for errors induced by the spectral characteristics of the respective pigment colors in each of the respective color bands and the spectral sensitivity of the panchromatic emulsion used, shutting off those light images associated with factors having a positive sign and then exposing a panchromatic photosensitive element to the combined intensities of those light images remaining and whose factors bear a negative sign, developing said element to create a mask, shutting off those light images associated with factors having a negative sign and then exposing through said mask a second panchromatic photosensitive element to the combined intensities of those light images remaining and whose factors bear a positive sign, and finally developing said second photosensitive element.

References Cited in the file of this patent

UNITED STATES PATENTS

| | | |
|---|---|---|
| 2,193,722 | Hardy | Mar. 12, 1940 |
| 2,466,154 | Conklin | Apr. 5, 1949 |
| 2,484,137 | Wheldon | Oct. 11, 1949 |
| 2,533,285 | Thomas | May 15, 1951 |
| 2,567,240 | Sites | Sept. 11, 1951 |
| 2,692,825 | Sprotelli | Oct. 26, 1954 |

OTHER REFERENCES

"Masking for Reflection Copy," Kodak Graphic Arts Data Books, Eastman Kodak Co., 1957, pages 5–8.

Preucil:: "Masking for Color Correction," the National Lithographic, January 1948 pages 32, 33 and 60.

UNITED STATES PATENT OFFICE
CERTIFICATE OF CORRECTION

Patent No. 3,099,557            July 30, 1963

Benjamin L. Sites

It is hereby certified that error appears in the above numbered patent requiring correction and that the said Letters Patent should read as corrected below.

Column 4, line 11, for "gree" read -- green --; column 5, line 23, for "B=+.125227" read -- B=+.145227 --.

Signed and sealed this 25th day of February 1964.

(SEAL)
Attest:
ERNEST W. SWIDER            EDWIN L. REYNOLDS

Attesting Officer            Acting Commissioner of Patents